US011790678B1

(12) United States Patent
Beechinor et al.

(10) Patent No.: US 11,790,678 B1
(45) Date of Patent: Oct. 17, 2023

(54) METHOD FOR IDENTIFYING ENTITY DATA IN A DATA SET

(71) Applicant: ALTADA TECHNOLOGY SOLUTIONS LTD., Ballincollig (IE)

(72) Inventors: Allan Beechinor, Ballincollig (IE); Sourabh Dixit, Ballincollig (IE); Anurag Banerjee, Ballincollig (IE); Chavvi Nihal Chandani, Ballincollig (IE); Shivansh Bhandari, Ballincollig (IE)

(73) Assignee: COMETGAZE LIMITED, Terenure (IE)

( * ) Notice: Subject to any disclaimer, the term of this patent is extended or adjusted under 35 U.S.C. 154(b) by 0 days.

(21) Appl. No.: 17/708,370

(22) Filed: Mar. 30, 2022

(51) Int. Cl.
*G06K 9/00* (2022.01)
*G06V 30/19* (2022.01)

(52) U.S. Cl.
CPC .. *G06V 30/19127* (2022.01); *G06V 30/19093* (2022.01); *G06V 30/19113* (2022.01); *G06V 30/19173* (2022.01)

(58) Field of Classification Search
CPC ...... G06N 20/00; G06N 3/0454; G06N 7/005; G06N 3/08; G06N 5/003; G06N 5/04; G06N 20/10; G06N 3/0445; G06N 3/084; G06N 20/20; G06N 5/022; G06N 5/046; G06N 3/006; G06N 3/0427; G06N 5/00; G06N 5/02; G06N 5/025; G06N 5/041; G06N 5/045; G06N 5/047; G06N 7/023; G10L 15/22; G10L 15/26; G10L 15/063; G10L 15/197; G10L 15/32; G10L 15/16
See application file for complete search history.

(56) References Cited

U.S. PATENT DOCUMENTS

| | | | |
|---|---|---|---|
| 10,431,210 B1 * | 10/2019 | Huang | G06F 40/216 |
| 2018/0233131 A1 * | 8/2018 | Aleksic | G10L 15/1815 |
| 2018/0300315 A1 * | 10/2018 | Leal | G06F 16/355 |

* cited by examiner

*Primary Examiner* — Alex Kok S Liew
(74) *Attorney, Agent, or Firm* — NIXON & VANDERHYE P.C.

(57) ABSTRACT

A data processing system receives a plurality of electronic documents in image format, and extracts text data using an optical character recognition processor. The system determines a plurality of candidate entity data and candidate context data based on the extracted text data using a trained natural language processing closed-domain question answering model. The system accesses n-gram words stored in a knowledge base, and determines similarity scores between each candidate context data and each of the n-gram words. The system determines a weighted average of the similarity scores, and selects an optimum entity data from the plurality of candidate entity data based on the weighted average of the similarity scores.

19 Claims, 17 Drawing Sheets

Charles Sharma,

129 Upland Avenue,

Polk, Kentucky, 49503

10.03.2022

Re: Permission to use content"

Dear Charles,

This letter agreement (the agreement) confirms the terms on which you Charles Sharma (you or Assignor) agree to allow Attada Technology Solutions Limited (Attada) to use, for the purposes set out below, any photographs, video or audio recordings that are taken of you, by or on behalf of Attada, in connection with your participation in Attada Annual Event on 12.03.2022 (the Content).

1. In consideration for your entry to and participation in the Attada Annual Event (the sufficiency of which you expressly acknowledge), you hereby assign to Attada absolutely the following rights throughout the world:

1.1 the entire copyright and all other rights in the nature of copyright subsisting in the Content and any additional content which we may develop in the future which incorporates some or all of the Content (Future Content) and in all preliminary drafts or earlier versions of the Content and the Future Content;

1.2 any database right subsisting in the Content and the Future Content and in all preliminary drafts or earlier versions of the Content and the Future Content; and 1.3 all other rights in the Content and the Future Content of whatever nature, whether now known or created in the future, to which you are now, or at any time after the date of this agreement may be, entitled by virtue of the laws in force in the Republic of Ireland and in any other part of the world.

Fig. 12 in each case in perpetuity and together with all related rights and powers arising or accrued, including the right to bring, make, oppose, defend, appeal proceedings, claims or actions and obtain relief (and to retain any damages recovered) in respect of any infringement, or any other cause of action arising from ownership, of any of these assigned rights, whether occurring before, on, or after the date of this agreement.

2. To the extent applicable, you waive absolutely of shall procure the waiver of any moral rights arising under the Copyright and Related Rights Act 2000 (as amended) and, so far as is legally possible, any broadly equivalent rights you in any territory of the world and shall provide to Attada absolute waivers of all moral rights in each Future Content promptly on its creation.

3. At Attada's expense you shall, and shall use all reasonable endeavours to procure that any necessary third party shall, promptly execute such documents and perform such acts as may be required for the purpose of giving full effect to this agreement, including assisting Attada in obtaining, defending and enforcing the copyright, and assisting with any other proceedings which may be brought by or against Attada against or by any third party relating to the rights assigned by this agreement.

4. No failure or delay by a party to exercise any right or remedy provided under this agreement or by law shall constitute a waiver of that or any other right or remedy, nor shall it prevent or restrict the further exercise of that or any other right or remedy. No single or partial exercise of such right or remedy shall prevent or restrict the further exercise of that or any other right or remedy.

5. No variation of this agreement shall be effective unless it is in writing and signed by the parties (or their authorised representatives).

6. This agreement and any dispute or claim (including non-contractual disputes or claims) arising out of or in connection with it or its subject matter or formation) shall be governed by and construed in accordance with the laws of the Republic of Ireland.

7. Each party irrevocably agrees that the courts of the Republic of Ireland shall have exclusive jurisdiction to settle any dispute or claim (including non-contractual disputes or claims) arising out of or in connection with this agreement or its subject matter or formation.

Yours sincerely,

*Aideen Gah*

Fig. 13

For and on behalf of ALTADA TECHNOLOGY SOLUTIONS LIMITED

Accepted and agreed by Charles Sharma:

*Charles Sharma*

Date ...10/03/2022..........................

Please confirm your acceptance of the above by signing both copies of this agreement. Please return one copy and retain one copy for your records. Please also include your address and contact details in the space set out below.

Address: 129 Upland Avenue, Polk, Kentucky, 49503

Email: .....charles@kopiker.com..........................

Telephone: .....0980045118..........................

Fig. 14

Charles Sharma,

129 Upland Avenue,

Polk, Kentucky, 49503

10.03.2022

Re: Permission to use content[1]

Dear Charles,

This letter agreement (the agreement) confirms the terms on which you Charles Sharma (you or Assignor) agree to allow Altada Technology Solutions Limited (Altada) to use, for the purposes set out below, any photographs, video or audio recordings that are taken of you, by or on behalf of Altada, in connection with your participation in Altada Annual Event on 12.03.2022 (the Content).

1. In consideration for your entry to and participation in the Altada Annual Event (the sufficiency of which you expressly acknowledge), you hereby assign to Altada absolutely the following rights throughout the world:

Fig. 15

5. No variation of this agreement shall be effective unless it is in writing and signed by the parties (or their authorised representatives).

6. This agreement and any dispute or claim (including non-contractual disputes or claims) arising out of or in connection with it or its subject matter or formation) shall be governed by and construed in accordance with the laws of the Republic of Ireland.

7. Each party irrevocably agrees that the courts of the Republic of Ireland shall have exclusive jurisdiction to settle any dispute or claim (including non-contractual disputes or claims) arising out of or in connection with this agreement or its subject matter or formation.

Yours sincerely,

Fig. 16

METHOD FOR IDENTIFYING ENTITY DATA IN A DATA SET

BACKGROUND

The present invention relates to a computer-implemented method, a data processing system, and a computer program product for identifying entity data in a data set.

It is known to use computer vision and process automation technology to review and extract data from simple electronic documents. However the existing computer vision and process automation technology does not allow for review of complex, data-rich electronic documents, such as those involving a mixture of text, tables, images and the like. Currently it is therefore not possible to replace the manual review of these complex, data-rich documents by a person which is time-consuming, expensive, and prone to human error.

SUMMARY

There is therefore a need for an improved computer vision and process automation technology to enable review of complex, data-rich electronic documents.

According to a first aspect of the described embodiments there is provided a computer-implemented method for identifying entity data in a data set, the method comprising the steps of:
receiving a data set,
extracting text data from the data set using a text extractor,
determining a plurality of candidate entity data and candidate context data based on the extracted text data using a trained natural language processing model,
accessing one or more of n-gram words stored in a knowledge base,
determining one or more similarity scores based on the candidate context data and the one or more n-gram words,
selecting an optimum entity data from the plurality of candidate entity data based on the one or more similarity scores.

The trained natural language processing model enables a highly accurate calculation of the candidate entities and the candidate context. In this manner the method of the described embodiments enables identification and review of all types of content within the data set, including a mixture of text, tables, images and the like. In this way the described embodiments are able to review complex, data-rich data sets.

By taking into consideration the n-gram words in the knowledge base, the method of the described embodiments ensures that the most similar candidate entity is identified as being the optimum. The described embodiments thus deliver highly accurate results regardless of the mix of content within the data set and regardless of how complex the data set is.

The described embodiments provide an end-to-end artificial intelligence platform that achieves the required consistent and accurate outcomes to replace a human with hugely improved processing times by a factor of 25 times faster or more. The method of the described embodiments is able to read and locate text in the data set with no limitations of reading non-text aspects also. The described embodiments represent a significant improvement compared to current computer vision and process automation technology which cannot deal with complex, data-rich electronic documents.

It will be appreciated that the term 'knowledge base' as used herein is intended to cover any general type of suitable means for storing data. The term 'knowledge base' is not limited or restricted to a particular application or a particular sector or a particular type of electronic documentation.

The text extractor may comprise an optical character recognition processor.

The described embodiments use the optical character recognition technique to extract the text. The optical character recognition processor may have various different types of model architecture, such as convolution, sequence to sequence, or transformers. The optical character recognition processor may use an intelligent character recognition technique to recognise fonts and handwriting.

A scanned image may lack underlying text and positional meta data. It may therefore be difficult to extract the semantic meaning from the underlying text. The optical character recognition processor of the described embodiments has been found to be a particularly suitable means of achieving natural language understanding.

The trained natural language processing model may comprise a closed-domain question answering model.

The accuracy achieved by the method of the described embodiments with the closed domain question answering model is substantially greater than alternative approaches, such as an open-domain question answering model. The closed domain question answering model is trained with enhanced data to achieve a far better understanding of the underlying language of the documents to perform downstream natural language understanding tasks with a much greater degree of accuracy.

The closed-domain question answering model allows the described embodiments to work so well because it is trained on enhanced domain specific data, which leads to reduced training time and improved accuracy in comparison to general or open domain models.

The one or more similarity scores may be determined by determining a similarity score between each candidate context data and each of the one or more n-gram words.

The n-gram words are specific to each entity being analysed. The n-gram words define the topmost surrounding words for each entity, which in turn allows the method of the described embodiments to differentiate each entity from the other. Multiple entities may have the same surrounding words or n-grams. Hence the weights associated with the n-gram words play an important role in achieving the correct output and reducing mispredictions.

The method may comprise the step of determining a weighted average of the one or more similarity scores, and the optimum entity data may be selected based on the weighted average. By considering the weighted average the selection process may be configured by a user to be adapted to suit certain user requirements.

Multiple entities may have the same top n-gram words. However the weight related to each n-gram word would be different. The weighted average enables the described embodiments to determine the correct output and reduce mispredictions.

The method may comprise the steps of: modifying the data set based on the optimum entity data, and providing the modified data set to a user.

The described embodiments thus deliver the results of the analysis to the user in a user-friendly manner. The data set may be modified by visual highlighting of the optimum entity data. In this manner the results of the identification process may be displayed or otherwise communicated to the user for review.

The method may comprise the steps of:

receiving feedback data from a user, and modifying at least one of the knowledge base, and the natural language processing model based on the feedback data.

In this manner the method of the described embodiments may be iteratively updated and improved based on supervised learning by the user.

The method may comprise the step of training the natural language processing model by:

receiving a training data set, extracting training text data from the training data set using the text extractor, determining a plurality of training entity data based on the extracted training text data using an initialisation data set, receiving one or more question data from a user, determining one or more answer data based on the plurality of training entity data and the one or more question data using a second natural language processing model, determining training context data based on the plurality of training entity data and the one or more question data, and training the natural language processing model based on the one or more answer data and the training context data.

The trained natural language processing model enables a highly accurate calculation of the candidate entities and the candidate context. In this manner the method of the described embodiments enables identification and review of all types of content within the data set, including a mixture of text, tables, images and the like. In this way the described embodiments are able to review complex, data-rich data sets.

The method may comprise the steps of:

determining a plurality of n-gram words based on the one or more answer data and the training context data using a further natural language processing model, and storing at least some of the n-gram words in the knowledge base.

By taking into consideration the n-gram words in the knowledge base, the method of the described embodiments ensures that the most similar candidate entity is identified as being the optimum. The described embodiments thus deliver highly accurate results regardless of the mix of content within the data set and regardless of how complex the data set is.

The method may comprise the steps of:

receiving classification selection data from the user, and identifying a sub-set of the training data set based on the classification selection data.

Each sub-set may have different entity data to be extracted, and hence a different model may be optimum to be applied to a particular sub-set.

The method may comprise the step of determining a classification for each of the sub-set of the training data set based on the extracted training text data using a representation model.

The initialisation data set may be pre-defined.

The second natural language processing model may comprise an open-domain question answering model.

The second natural language processing model may comprise a named entity recognition model, or an entity ruler model, or a fuzzy match model.

The open domain question answering model performs with particularly high accuracy because many answers are questions to named entities. Therefore pre-annotated open domain questions in combination with pre-annotated context data increases the effectiveness of the closed domain question answering model. The performance of the closed domain question answering model benefits from the annotated free text from the open domain question answering model.

The method may comprise the steps of:

providing the one or more answer data to the user, and receiving corrected entity data from the user, wherein the natural language processing model is trained based on the corrected entity data and the training context data.

The plurality of n-gram words may be determined based on the corrected entity data and the training context data using the further natural language processing model. In this manner the method of the described embodiments may be iteratively corrected and improved based on supervised learning by the user.

The data set may comprise one or more electronic documents. The one or more electronic documents may be received in image format. The method of the described embodiments is applicable for use with a variety of possible complex, data-rich electronic documents, such as legal documents, legal pleadings, financial services documents, mortgage files, health care documents, security documents and the like.

According to a second aspect of the described embodiments there is provided a data processing system for identifying entity data in a data set, the system comprising a processor configured to:

receive a data set, extract text data from the data set using a text extractor, determine a plurality of candidate entity data and candidate context data based on the extracted text data using a trained natural language processing model, access one or more n-gram words stored in a knowledge base, determine one or more similarity scores based on the candidate context data and the one or more n-gram words, and select an optimum entity data from the plurality of candidate entity data based on the one or more similarity scores.

According to a third aspect of the described embodiments there is provided a computer program product comprising instructions capable of causing a computer system to perform a method of the first aspect of the described embodiments when the computer program product is executed on the computer system. The computer program product may be embodied on a record medium, or a carrier signal, or a read-only memory.

According to a fourth aspect of the described embodiments there is provided a computer-implemented method for training a natural language processing model to identify entity data in a data set, the method comprising the steps of:

receiving a data set, extracting text data from the data set using a text extractor, determining a plurality of entity data based on the extracted text data using an initialisation data set, receiving one or more pre-defined question data from a user, determining one or more answer data based on the plurality of entity data and the one or more question data using a second natural language processing model, determining context data based on the plurality of entity data and the one or more question data, training a third natural language processing model based on the one or more answer data and the context data, and determining one or more n-gram words based on the one or more answer data and the context data using a fourth natural language processing model.

The trained natural language processing model enables a highly accurate identification of entity data in a real-time data set in a subsequent processing. In this manner the method of the described embodiments with the trained natural language processing model enables identification and review of all types of content within a real-time data set, including a mixture of text, tables, images and the like. In this way the described embodiments are able to review complex, data-rich data sets.

By calculating and storing the n-gram words in the knowledge base, the method of the described embodiments ensures that in a subsequent identification of entity data in a real-time data set the most similar candidate entity will be identified as being the optimum. The described embodiments thus deliver highly accurate results regardless of the mix of content within the real-time data set and regardless of how complex the real-time data set is.

The method may comprise the steps of:
receiving classification selection data from the user, and
identifying a sub-set of the data set based on the classification selection data.

The text extractor may comprise an optical character recognition processor.

The method may comprise the step of determining a classification for each of the sub-set of the data set based on the extracted text data using a representation model. The representation model may comprise a bag-of-words model.

The second natural language processing model may comprise an open-domain question answering model.

The method may comprise the steps of:
providing the one or more answer data to the user, and
receiving corrected entity data from the user,
wherein the third natural language processing model is trained based on the corrected entity data and the context data.

In this manner the method of the described embodiments may be iteratively corrected and improved based on supervised learning by the user.

The method may comprise the step of re-aligning the context data based on the corrected entity data.

The method may comprise the step of converting the corrected entity data into squad format.

The squad format enables the third natural language processing model to be trained.

The third natural language processing model may comprise a closed-domain question answering model.

The fourth natural language processing model may comprise a context phrase model.

The context phrase model individually identifies the surrounding phrase that defines a particular entity. The context phrase model therefore achieves enhanced accuracy outputs and substantially reduced misprediction.

The one or more n-gram words may be determined based on the corrected entity data and the context data using the fourth natural language processing model. In this manner the method of the described embodiments may be iteratively corrected and improved based on supervised learning by the user.

The method may comprise the step of storing at least some of the n-gram words in a knowledge base.

The method may comprise the steps of:
determining one or more similarity scores based on the context data and the one or more n-gram words, and
selecting a sub-set of the one or more n-gram words based on the one or more similarity scores,
wherein the sub-set of the n-gram words is stored in the knowledge base.

The n-gram words are associated with certain weights. The method of the described embodiments selects the n-gram words that best represent a particular entity instead of merely selecting all possible words.

The method may comprise the steps of:
providing the sub-set of the n-gram words to the user,
receiving feedback data from the user, and
modifying at least one of the knowledge base, the third natural language processing model, and the fourth natural language processing model based on the feedback data.

In this manner the method of the described embodiments may be iteratively updated and improved based on supervised learning by the user.

The question data may be pre-defined. The question data may be defined by a user. The question data may be defined after reviewing the documents and after receiving the entity data.

The answer data may be pre-annotated. The answer data may be reviewed and annotated by a user. The answer data may be annotated after the open domain question answering model has been executed to predict text data.

The data set may comprise one or more electronic documents. The one or more electronic documents may be received in image format. The method of the described embodiments is applicable for use with a variety of possible complex electronic documents, such as legal documents, legal pleadings, financial services documents, mortgage files, health care documents, security documents and the like.

According to a fifth aspect of the described embodiments there is provided a data processing system for training a natural language processing model to identify entity data in a data set, the system comprising a processor configured to:
receive a data set,
extract text data from the data set using a text extractor,
determine a plurality of entity data based on the extracted text data using an initialisation data set,
receive one or more question data from a user,
determine one or more answer data based on the plurality of entity data and the one or more question data using a second natural language processing model,
determine context data based on the plurality of entity data and the one or more question data,
train a third natural language processing model based on the one or more answer data and the context data, and
determine one or more n-gram words based on the one or more answer data and the context data using a fourth natural language processing model.

According to a sixth aspect of the described embodiments there is provided a computer program product comprising instructions capable of causing a computer system to perform a method of the fourth aspect of the described embodiments when the computer program product is executed on the computer system. The computer program product may be embodied on a record medium, or a carrier signal, or a read-only memory.

According to a seventh aspect of the described embodiments there is provided a computer-implemented method for identifying a data segment in a data set, the method comprising the steps of:
receiving a data set,
identifying a plurality of data segments in the data set using a trained segmentation model, the plurality of data segments including one or more first type of data segments and one or more second type of data segments,
for at least one of the first type of data segments, determining associated text data using a first text extractor,
accessing one or more first data stored in a first knowledge base, determining one or more first similarity scores based on the associated text data and the one or more first data using a first natural language processing model, selecting an optimum first type of data segment based on the one or more first similarity scores, for at least one of the second type of data segments, extracting text data from the data segment using a second text extractor, accessing one or more second data stored in a second knowledge base, determining one or more second similarity scores based on the extracted text data and the one or more second data using a second natural language processing model, and selecting an optimum second type of data segment based on the one or more second similarity scores.

By considering both the first type of data segments and the second type of data segments, the method of the described embodiments enables a highly accurate identification of the two optimum segments in the data set. In this manner the method of the described embodiments enables identification and review of all types of content within the data set, including a mixture of text, tables, images, stamps, signatures, and the like. In this way the described embodiments are able to review complex, data-rich data sets.

By taking into consideration the data in the two knowledge bases, the method of the described embodiments ensures that the most similar segments are identified as being the optimum. The described embodiments thus deliver highly accurate results regardless of the mix of content within the data set and regardless of how complex the data set is.

The trained segmentation model may include computer vision approaches, and/or a convolutional neural network, and/or visual transformers, and/or a generative adversarial network.

The method may comprise the step of identifying a sub-set of the plurality of data segments based on a pre-defined threshold.

Each sub-set may have different entity data to be extracted, and hence a different model may be optimum to be applied to a particular sub-set.

The text extractor may comprise an optical character recognition processor.

The associated text data may comprise text data in distance proximity to the first type of data segment.

The associated text data may be selected based on features such as positional embeddings and distance metric.

The natural language processing model may comprise a statistical measure technique.

The natural language processing model may include a Jaro-Winkler model or a Levenshtein model.

The natural language processing model may be selected based on the trade-off between speed and accuracy. For example one model may be inefficient, and the accuracies may decrease with increase in data.

The method may comprise the step of identifying a sub-set of the associated text data based on the one or more first similarity scores, and the optimum first type of data segment may be selected based on the sub-set of the associated text data The n-gram words are associated with certain weights. The method of the described embodiments selects the n-gram words that best represent a particular entity instead of merely selecting all possible words.

The optimum first type of data segment may be selected based on a distance metric between the one or more first data and the associated text data.

The optimum first type of data segment may be selected based on distance, positional embeddings, and word to context similarity.

The method may comprise the steps of:
modifying the data set based on the optimum first type of data segment and the optimum second type of data segment, and
providing the modified data set to a user.

The described embodiments thus deliver the results of the analysis to the user in a user-friendly manner. The data set may be modified by visual highlighting of the optimum first type of data segment and the optimum second type of data segment. In this manner the results of the identification process may be displayed or otherwise communicated to the user for review.

The method may comprise the steps of:
receiving feedback data from a user, and
modifying at least one of the first knowledge base, the second knowledge base, the segmentation model, the first text extractor, the second text extractor, the first natural language processing model, and the second natural language processing model based on the feedback data.

In this manner the method of the described embodiments may be iteratively updated and improved based on supervised learning by the user.

The method may comprise the steps of:
determining the one or more first data,
storing the one or more first data in the first knowledge base,
determining the one or more second data, and
storing the one or more second data in the second knowledge base.

By calculating and storing the text in the two knowledge bases, the method of the described embodiments ensures that in a subsequent identification of segments in a real-time data set, the most similar segments will be identified as being the optimum. The described embodiments thus deliver highly accurate results regardless of the mix of content within the real-time data set and regardless of how complex the real-time data set is.

The method may comprise the steps of:
receiving a training data set,
identifying one or more first type of data segments in the training data set, and
identifying one or more second type of data segments in the training data set.

The method may comprise the steps of:
receiving annotation label data from the user, and
training the segmentation model based on the annotation label data.

The one or more first data may be determined by:
determining associated text data based on the annotation label data, and
determining a weighting factor for each associated text data, wherein the one or more first type of data segments, the associated text data, and the weighting factor are stored in the first knowledge base.

The annotation label data represents the positional information of an entity. Multiple entities may have the same top n-gram words. However the weights associated with each word would be different. Hence calculating the weighted average plays an important role in achieving the correct output and reducing mispredictions.

The one or more second type of data segments are stored in the second knowledge base.

The method may comprise the steps of:
providing the one or more first type of data segments, the associated text data, the weighting factor, and the one or more second type of data segments to the user,
receiving feedback data from the user, and
modifying at least one of the first knowledge base, the second knowledge base, and the segmentation model based on the feedback data.

In this manner the method of the described embodiments may be iteratively updated and improved based on supervised learning by the user.

The data set may comprise one or more electronic documents. The one or more electronic documents may be received in image format. The method of the described embodiments is applicable for use with a variety of possible complex electronic documents, such as legal documents, legal pleadings, financial services documents, mortgage files, health care documents, security documents and the like.

According to an eighth aspect of the described embodiments there is provided a data processing system for identifying a data segment in a data set, the system comprising a processor configured to:
receive a data set,
identify a plurality of data segments in the data set using a trained segmentation model, the plurality of data segments including one or more first type of data segments and one or more second type of data segments,
for at least one of the first type of data segments, determine associated text data using a first text extractor,
access one or more first data stored in a first knowledge base,
determine one or more first similarity scores based on the associated text data and the one or more first data using a first natural language processing model,
select an optimum first type of data segment based on the one or more first similarity scores,
for at least one of the second type of data segments, extract text data from the data segment using a second text extractor,
access one or more second data stored in a second knowledge base,
determine one or more second similarity scores based on the extracted text data and the one or more second data using a second natural language processing model, and
select an optimum second type of data segment based on the one or more second similarity scores.

According to a ninth aspect of the described embodiments there is provided a computer program product comprising instructions capable of causing a computer system to perform a method of the seventh aspect of the described embodiments when the computer program product is executed on the computer system. The computer program product may be embodied on a record medium, or a carrier signal, or a read-only memory.

BRIEF DESCRIPTION OF THE DRAWINGS

Embodiments will be described hereinafter, by way of example only, with reference to the accompanying drawings, in which:

FIG. 12 is a first page of an example electronic document,
FIG. 13 is a second page of the example electronic document of FIG. 12,
FIG. 14 is a third page of the example electronic document of FIG. 12,
FIG. 15 is the first page of the example electronic document of FIG. 12 with entity data highlighted,
FIG. 16 is the second page of the example electronic document of FIG. 13 with a data segment highlighted.

DETAILED DESCRIPTION

Figure 1:
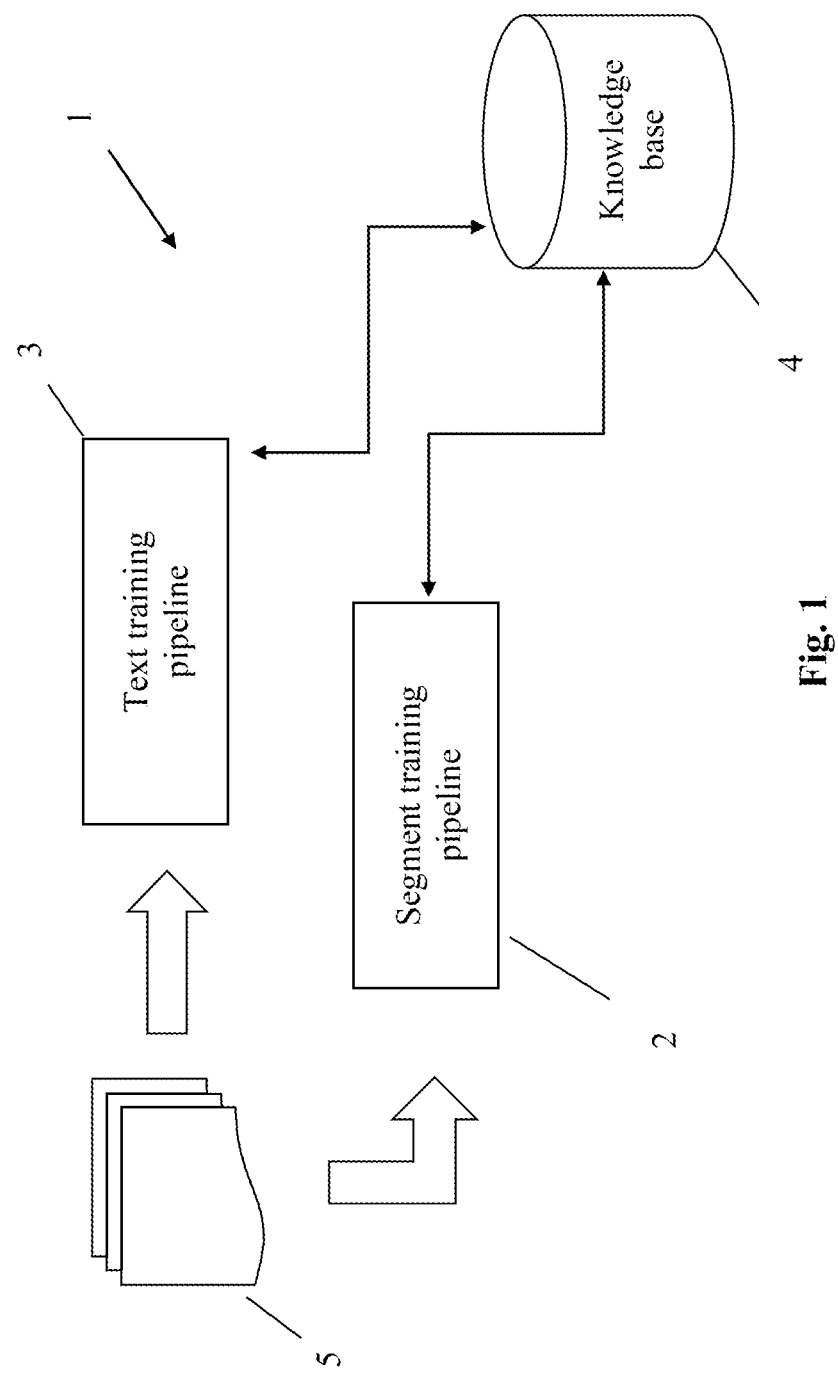
FIG. 1 is a schematic illustration of training of a data processing system according to the described embodiments.

In the drawings like reference numerals refer to like parts.

Referring to the drawings there is illustrated a data processing system 1 according to the described embodiments. Training of the data processing system 1 with a training data set is illustrated in FIGS. 1 to 5, and use of the data processing system 1 with a real-time data set is illustrated in FIGS. 6 to 11.

Training of the data processing system 1 includes a text training pipeline 3 and a segment training pipeline 2 (FIG. 1).

Figure 2:
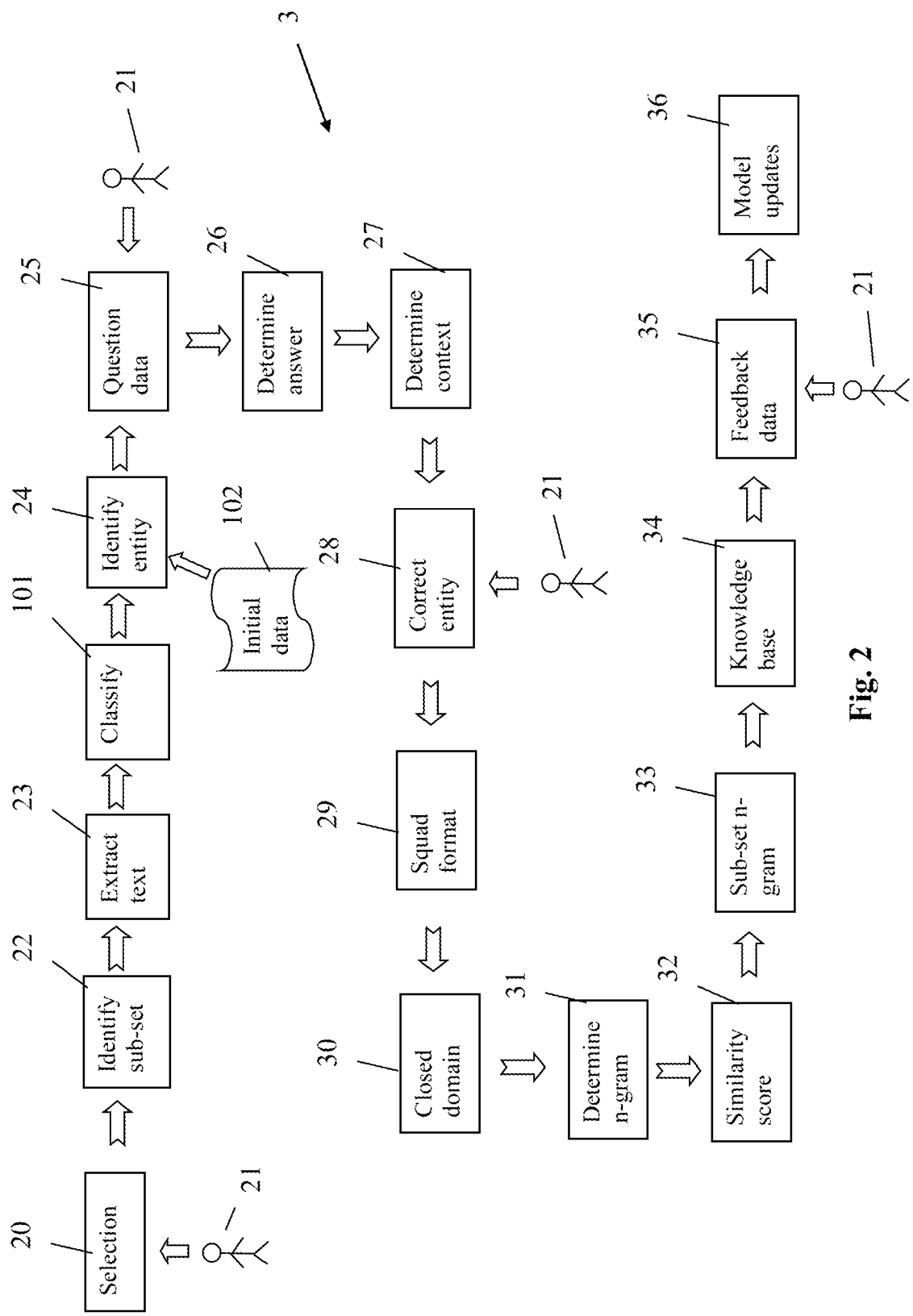
FIG. 2 is a flow chart of steps of a text training pipeline part of training of the data processing system of FIG. 1.
Figure 3:
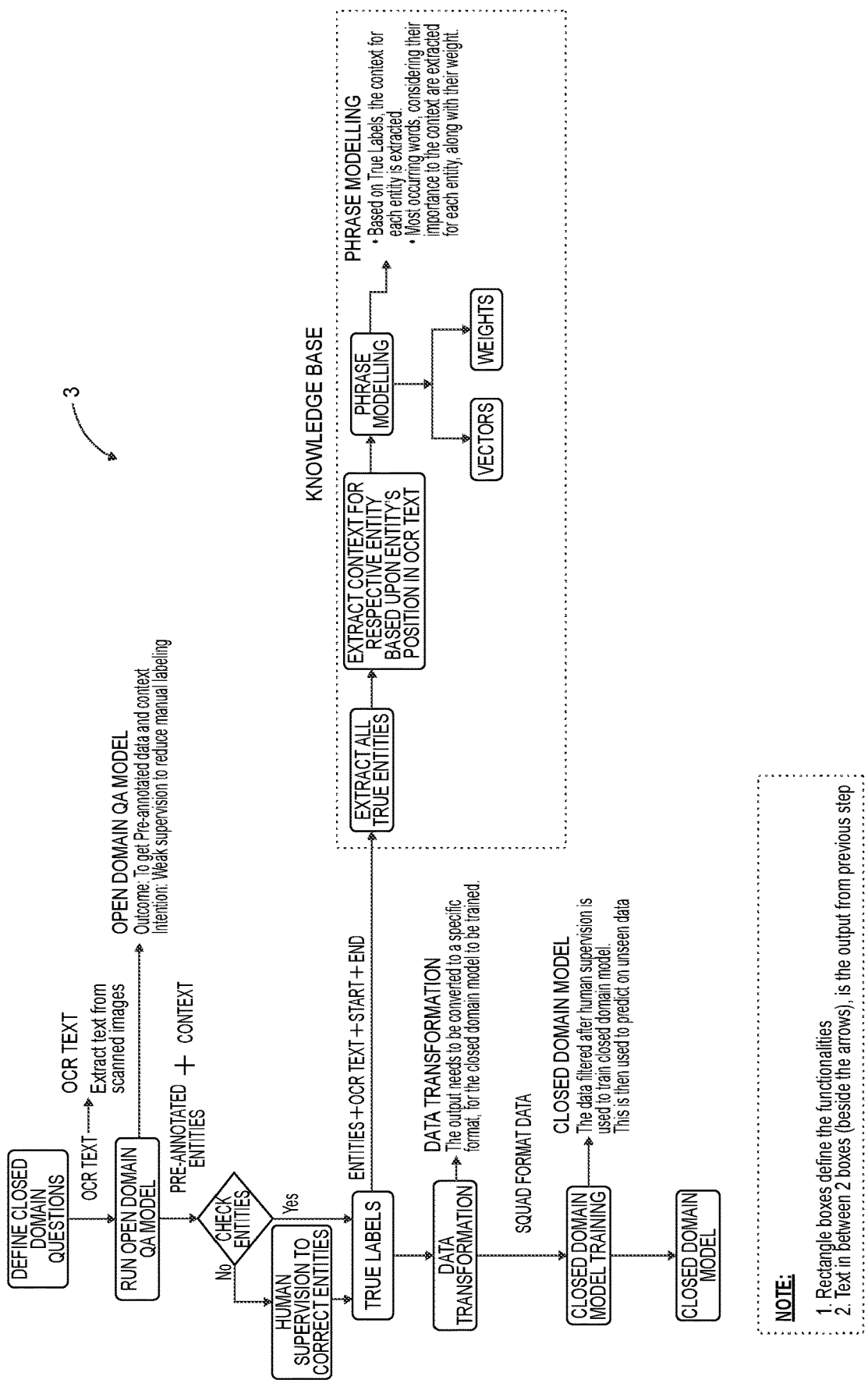
FIG. 3 is a schematic illustration of the text training pipeline of FIG. 2.

In relation to the text training pipeline 3 illustrated in FIGS. 2 and 3, the system 1 receives a training data set 5 (FIG. 1). In this case the training data set 5 comprises a plurality of electronic documents in image format, such as mortgage documents, legal documents, or accounting documents. The system 1 receives a document classification selection 20 from a user 21, for example by means of a user selecting from a drop-down list displayed on a graphical user interface. The system 1 identifies a sub-set 22 of the electronic documents based on the classification selection. The system 1 extracts text 23 from the sub-set of electronic documents using a text extractor. In this case the text extractor comprises an optical character recognition processor. The system 1 determines a classification 101 for each of the sub-set of electronic documents based on the extracted text using a representation model. In this case the representation model comprises a bag-of-words model.

The system 1 determines a plurality of entity data 24 based on the extracted text and the document classification using an initialisation data set 102. In this case the initialisation data set 102 is pre-defined by an administration user, such as a domain expert. The entities may be for example document title, lender name, loan modification amount, modification date, and the like. The system 1 receives pre-defined question data 25 from the user 21. The system 1 determines pre-annotated answer data 26 based on the entity data and the question data using a second natural language processing model. In this case the second natural language processing model comprises an open-domain question answering model. The system 1 determines context data 27 based on the entity data and the question data.

The system 1 provides the pre-annotated answer data to the user 21, for example by displaying the pre-annotated answer data using a graphical user interface. The system 1 receives corrected entity data 28 from the user 21. The system 1 re-aligns the context data based on the corrected entity data. The system 1 converts the corrected entity data into squad format 29. The system 1 trains a third natural language processing model 30 based on the corrected entity data and the re-aligned context data. In this case the third natural language processing model comprises a closed-domain question answering model. The closed-domain question answering model is trained to subsequently identify entity data in a real-time data set, such as a plurality of electronic documents in image format.

The system 1 determines a plurality of n-gram words 31 based on the corrected entity data and the context data using a fourth natural language processing model. In this case the fourth natural language processing model comprises a context phrase model. The system 1 determines similarity scores 32 based on the context data and each of the n-gram words. The system 1 selects a sub-set 33 of the n-gram words based on the similarity scores. The sub-set of the n-gram words are stored 34 in a knowledge base 4 (FIG. 1). The knowledge base 4 may have a text knowledge base section for storing the sub-set of the n-gram words.

The system 1 provides the sub-set of the n-gram words to the user 21, for example by displaying the sub-set of the n-gram words using a graphical user interface. It will be appreciated that the sub-set of the n-gram words may be communicated to the user 21 in any suitable format. The system 1 receives user feedback data 35. The system 1 updates 36 the knowledge base 4, the third natural language processing closed-domain question answering model, and the fourth natural language processing context phrase model based on the user feedback data.

Figure 4:
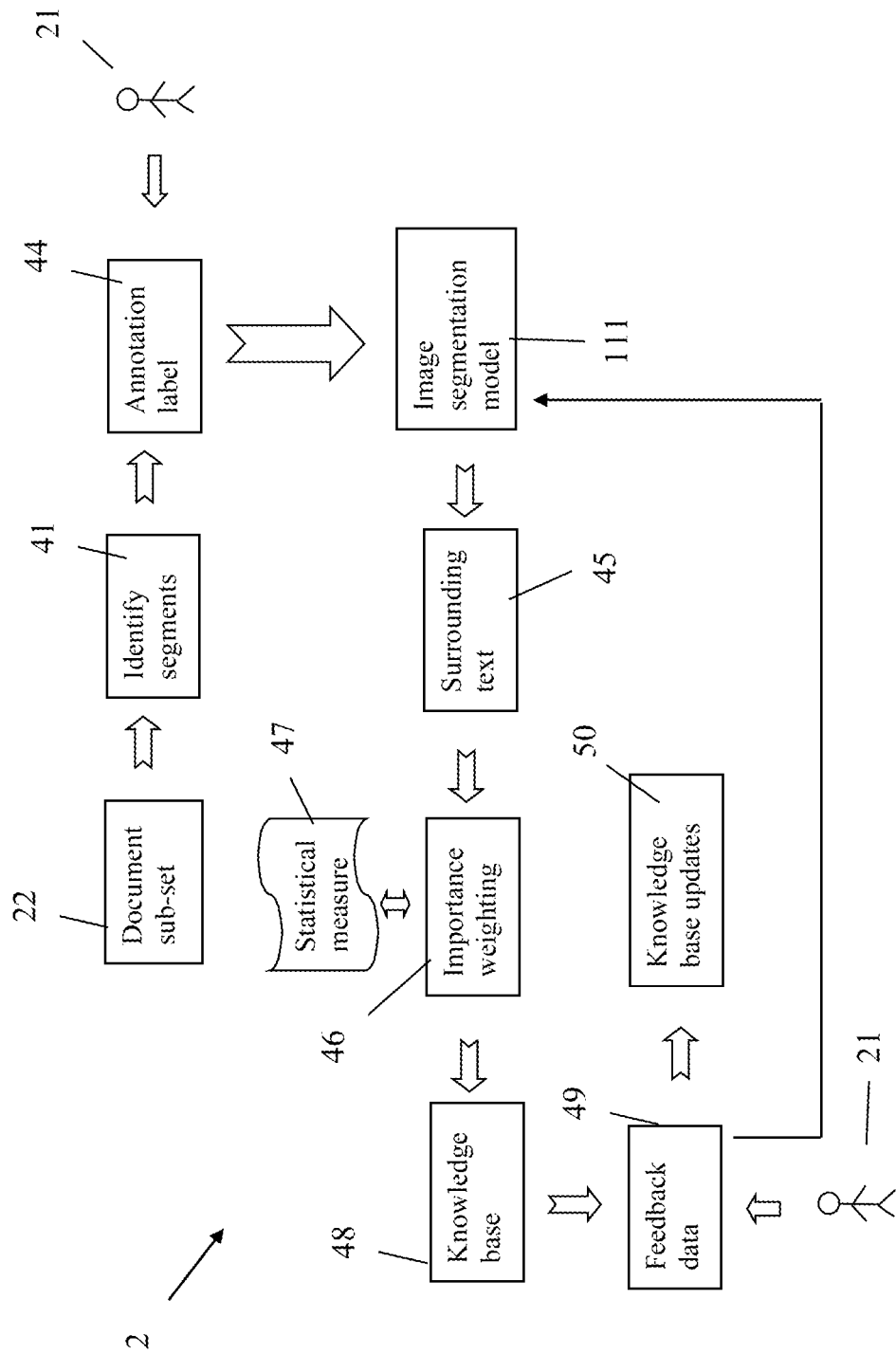
FIG. 4 is a flow chart of steps of a segment training pipeline part of training of the data processing system of FIG. 1.
Figure 5:
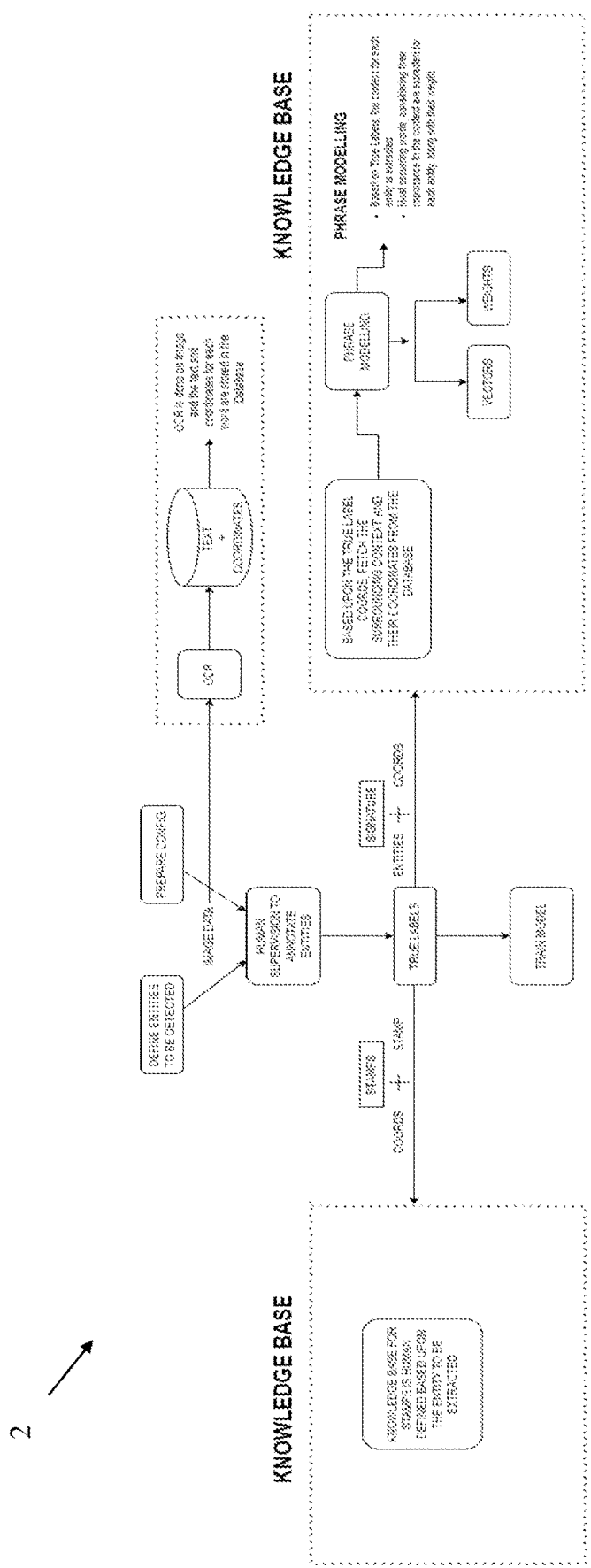
FIG. 5 is a schematic illustration of the segment training pipeline of FIG. 4.

In relation to the segment training pipeline 2 illustrated in FIGS. 4 and 5, the system 1 receives the training data set 5 (FIG. 1). In this case the training data set 5 comprises a plurality of electronic documents in image format, such as mortgage documents, legal documents, accounting documents, and the like. The system 1 receives the document classification selection 20 from the user 21, for example by means of the user 21 selecting from a drop-down list displayed on a graphical user interface. The system 1 identifies the sub-set 22 of the electronic documents based on the classification selection.

The system 1 identifies segments 41 in each electronic document in the sub-set using an image model. The identified segments may be for example a table, or a signature, or a stamp in the electronic document.

The system 1 receives annotation label data 44 from the user 21. The user 21 may be a domain expert. The annotation label data provides a classification for each identified segment. The system 1 trains an image segmentation model 111 based on the annotation label data.

The image segmentation model may be trained in relation to a first type of data segment, such as a signature in an electronic document. For example a classification for an identified signature segment may be a 'borrower signature', or a 'notary signature'. In this case the image segmentation model may be a signature segmentation model. For each of the first type of signature segments, the system 1 determines associated surrounding text 45 based on the annotation label data.

For each of the first type of signature segments, the system 1 determines a weighting importance factor 46 for each associated surrounding text using a statistical measure technique 47. For example the statistical measure technique 47 may be a distance metric technique, or a fuzzy matching technique. The statistical measure technique 47 determines how closely the associated surrounding text are correlated and how relevant a word in the associated surrounding text is in relation to an electronic document. For each of the first type of signature segments, the system 1 stores 48 the signature segment, the associated surrounding text, and the weighting importance factors in the knowledge base 4 (FIG. 1). The signature segment, the associated surrounding text, and the weighting importance factors stored in the knowledge base 4 minimise the likelihood of any mis-predictions in a subsequent segment inference pipeline 13. The knowledge base 4 may have a signature knowledge base section for storing the signature segment, the associated surrounding text, and the weighting importance factors.

The image segmentation model may be trained in relation to a second type of data segment, such as a stamp in an electronic document. In this case the image segmentation model may be a stamp segmentation model. For each of the second type of stamp segments, the system 1 stores 48 the stamp segment in the knowledge base 4 (FIG. 1). The knowledge base 4 may have a stamp knowledge base section for storing the stamp segment.

The system 1 provides the signature segment, the associated surrounding text, the weighting importance factors, and the stamp segment to the user 21, for example by displaying using a graphical user interface. In response to displaying the signature segment, the associated surrounding text, the weighting importance factors, and the stamp segment, the system 1 receives user feedback data 49. The system 1 updates 50 the data stored in the signature knowledge base section and the stamp knowledge base section based on the user feedback data. The system 1 updates the image segmentation model based on the user feedback data (FIG. 4).

Figure 6:
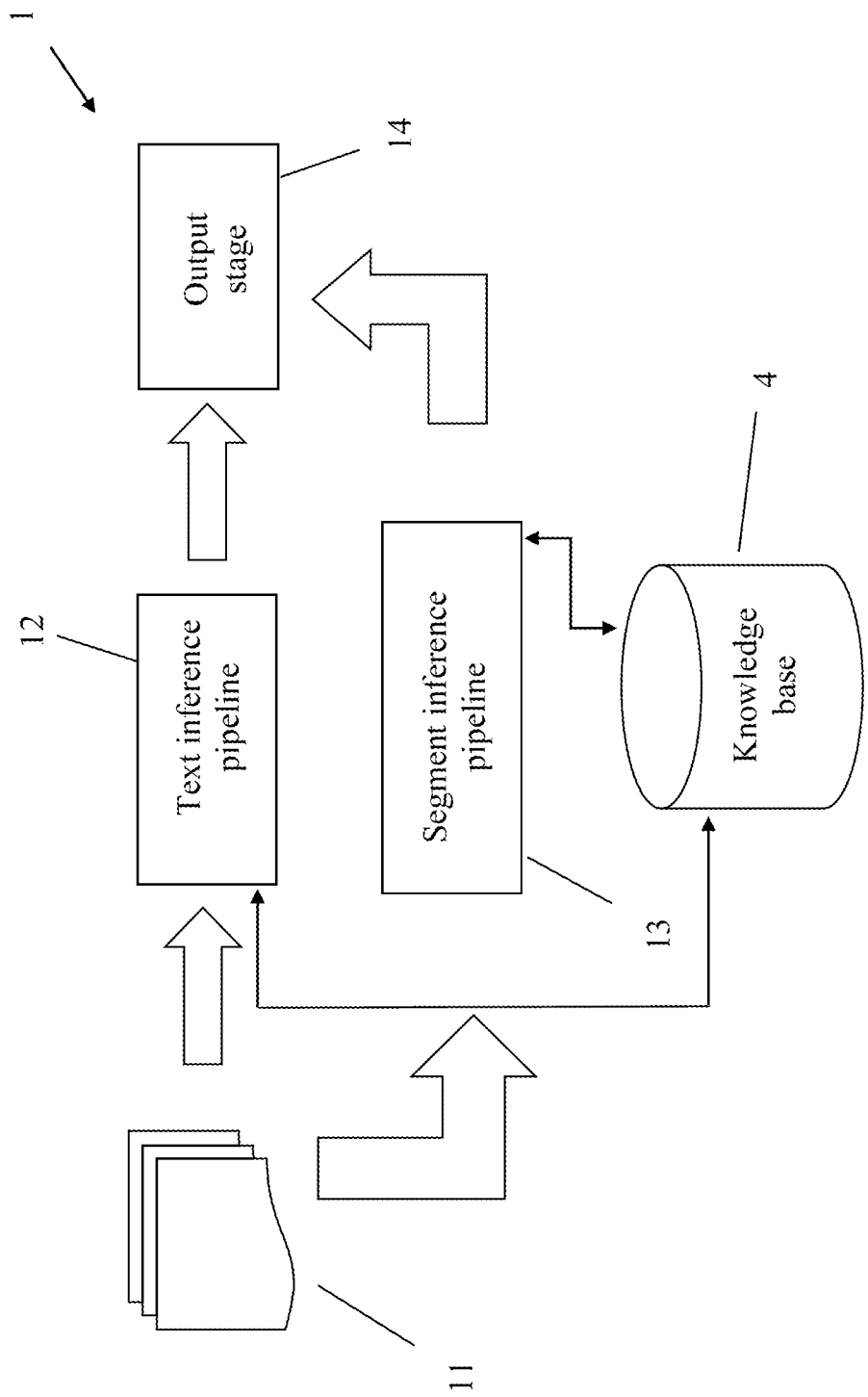
FIG. 6 is a schematic illustration of the data processing system of FIG. 1 in use.

Use of the data processing system 1 to identify entity data in a real-time data set 11 and to identify data segments in the real-time data set 11 includes a text inference pipeline 12, a segment inference pipeline 13, and an output stage 14 (FIG. 6).

Figure 7:
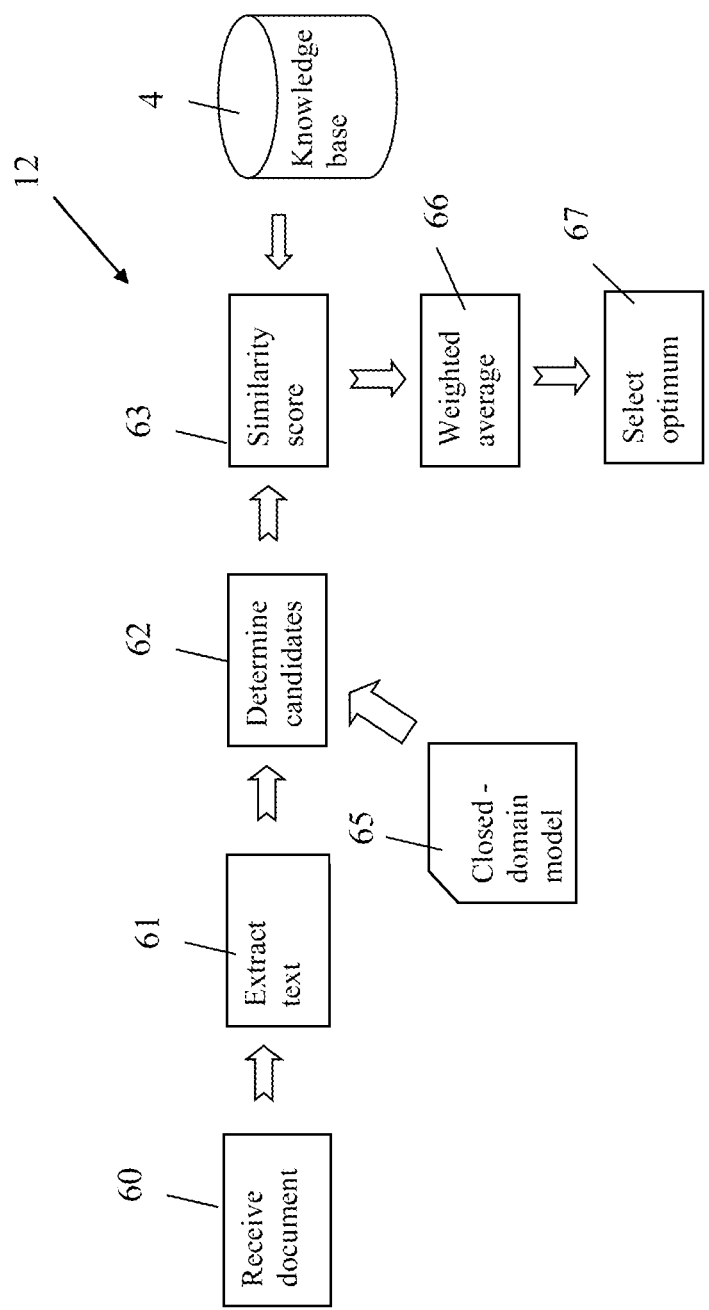
FIG. 7 is a flow chart of steps of a text inference pipeline part of the data processing system of FIG. 6 in use.
Figure 8:
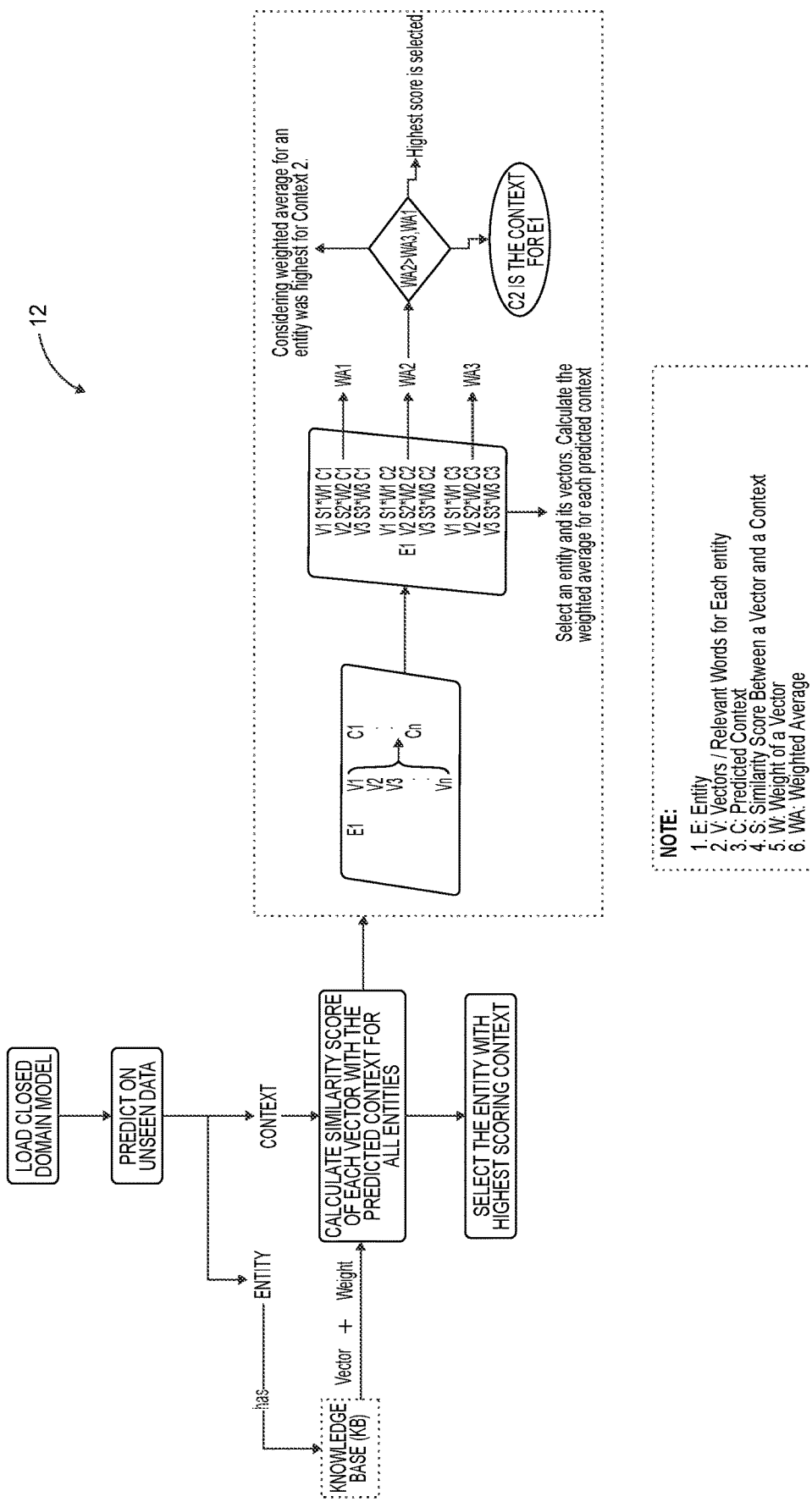
FIG. 8 is a schematic illustration of the text inference pipeline of FIG. 7.

In relation to the text inference pipeline 12 illustrated in FIGS. 7 and 8, the system 1 receives the real-time data set 11. In this case the real-time data set 11 comprises a plurality of electronic documents in image format, such as mortgage documents, legal documents, accounting documents. A first page of an example of an electronic document is illustrated in FIG. 12, a second page of the example electronic document is illustrated in FIG. 13, and a third page of the example electronic document is illustrated in FIG. 14. In this case the example electronic document is a legal release document.

The system 1 extracts text data 61 from the real-time data set 11 using a text extractor. In this case the text extractor comprises an optical character recognition processor. The system 1 determines a plurality of candidate entity data and candidate context data 62 based on the extracted text data using the trained third natural language processing closed-domain question answering model 65.

The system 1 accesses the n-gram words stored in the text knowledge base section of the knowledge base 4. The system 1 determines similarity scores 63 between each candidate context data and each of the n-gram words. The system 1 determines a weighted average 66 of the similarity scores. The system 1 selects 67 an optimum entity data from the plurality of candidate entity data based on the weighted average of the similarity scores.

Figure 9:
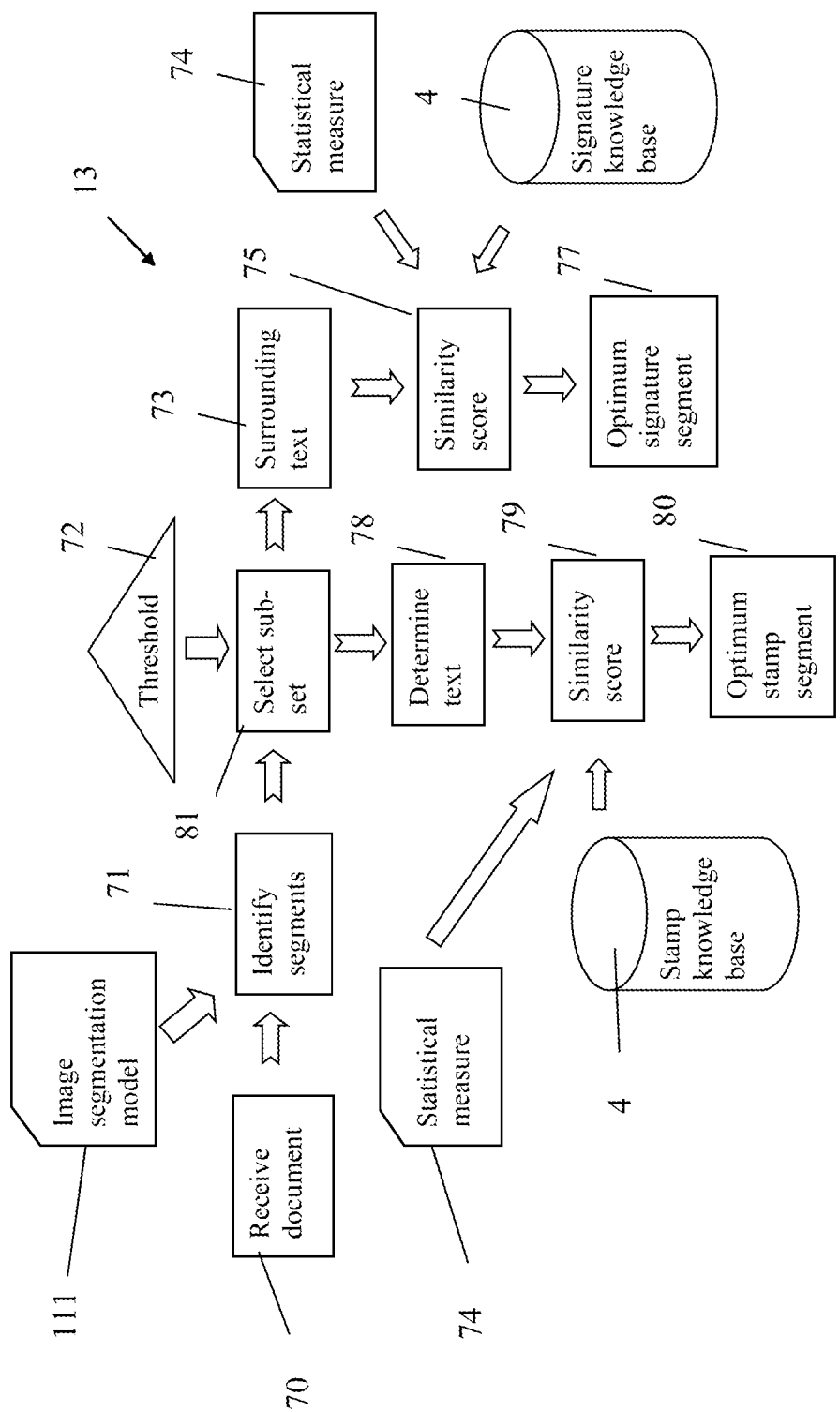
FIG. 9 is a flow chart of steps of a segment inference pipeline part of the data processing system of FIG. 6 in use.
Figure 10:
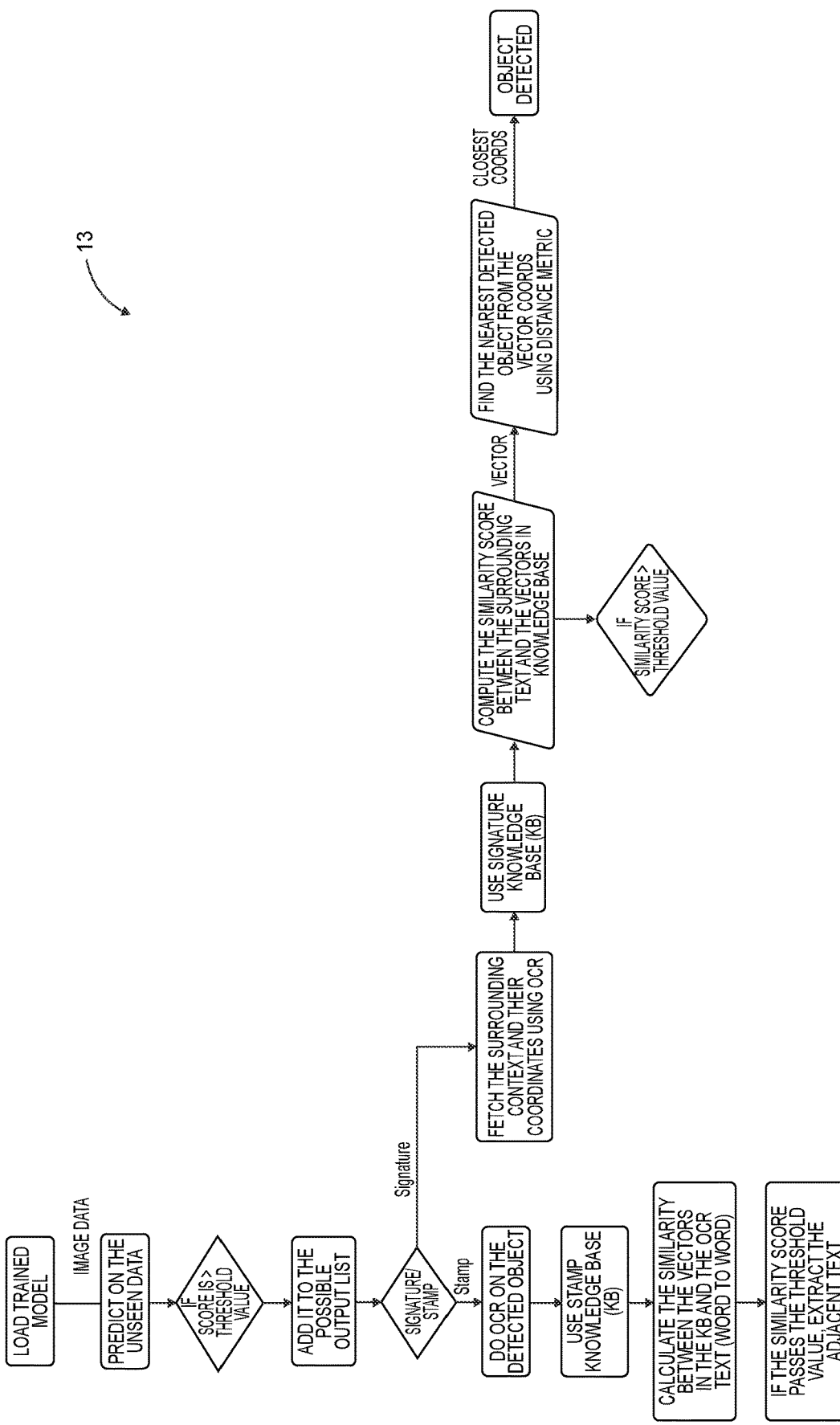
FIG. 10 is a schematic illustration of the segment inference pipeline of FIG. 9.

In relation to the segment inference pipeline 13 illustrated in FIGS. 9 and 10, the system 1 receives 70 the real-time data set 11. In this case the real-time data set 11 comprises a plurality of electronic documents in image format, such as mortgage documents, legal documents, accounting documents. The system 1 identifies a plurality of data segments 71 in the real-time data set 11 using the trained image segmentation model 111. The identified data segments may include a first type of data segment such as a signature in an electronic document, and a second type of data segment such as a stamp in an electronic document. The system 1 identifies a sub-set 81 of the data segments based on a pre-defined threshold 72.

The threshold 72 represents the degree of machine confidence.

For each of the signature segments, the system 1 determines associated surrounding text 73 using a text extractor. In this case the text extractor comprises an optical character recognition processor. The associated surrounding text is the text data in proximity in terms of distance to each signature segment. The system 1 accesses first data stored in the signature knowledge base section of the knowledge base 4. The system 1 determines first similarity scores 75 based on the associated surrounding text and the first data accessed from the signature knowledge base section using a natural language processing model. In this case the natural language processing model comprises a statistical measure technique 74. For example the statistical measure technique 74 may be a distance metric technique, or a fuzzy matching technique. The statistical measure technique 74 determines how closely the associated surrounding text are correlated and how relevant a word in the associated surrounding text is in relation to an electronic document.

The system 1 identifies a sub-set of the associated surrounding text based on the first similarity scores. The system 1 selects an optimum signature segment 77 based on a distance metric between each signature segment and each associated surrounding text in the sub-set of associated surrounding text.

For each of the stamp segments, the system 1 extracts text 78 from the stamp segment using a text extractor. The text within the stamp segment is data mined. In this case the text extractor comprises an optical character recognition processor. The system 1 accesses second data stored in the stamp knowledge base section of the knowledge base 4. The system 1 determines second similarity scores 79 based on the extracted text and the second data accessed from the stamp knowledge base section using the statistical measure technique 74. The system 1 selects an optimum stamp segment 80 based on the second similarity scores.

Figure 11:
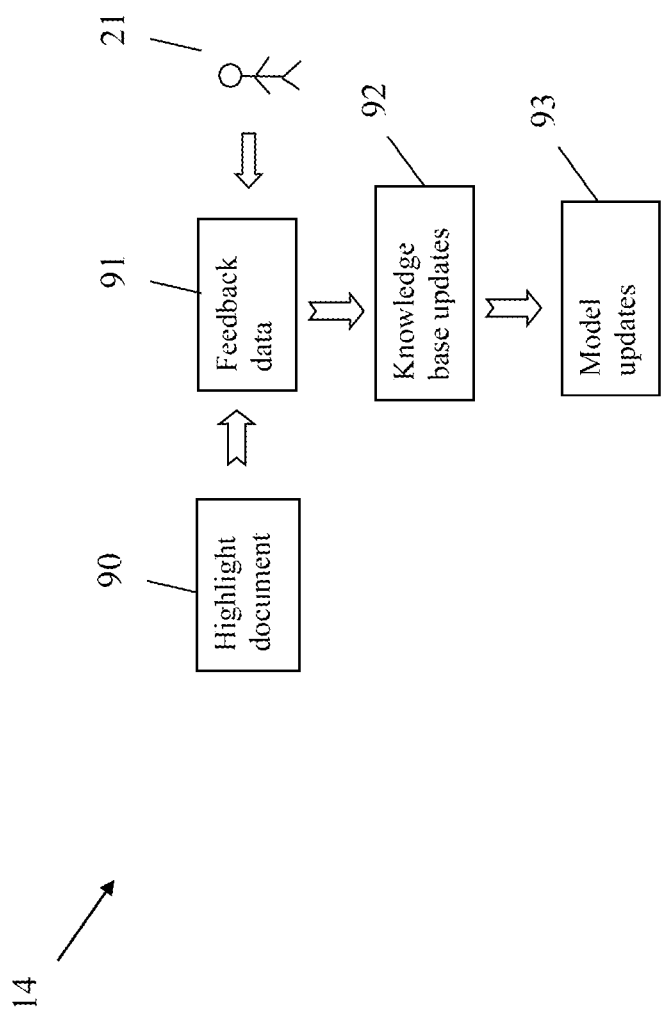
FIG. 11 is a flow chart of steps of an output stage part of the data processing system of FIG. 6 in use.

In relation to the output stage 14 illustrated in FIG. 11, the system 1 modifies 90 the electronic document in the real-time data set 11 based on the optimum entity data from the text inference pipeline 12, and based on the optimum signature segment and the optimum stamp segment from the segment inference pipeline 13. For example the electronic document may be modified by visual highlighting of the optimum entity data, the optimum signature segment, and the optimum stamp segment. The system 1 provides the modified electronic document to the user 21, for example by displaying the modified electronic document using a graphical user interface.

An example of a first page of a modified electronic document with three highlighted entity data is illustrated in FIG. 15. The first highlighted entity data is the person 'Charles Sharma', the second highlighted entity data is the organisation 'Altada Technology Solutions Limited', and the third highlighted entity data is the event 'Altada Annual Event'.

An example of a second page of the modified electronic document with one highlighted signature segment is illustrated in FIG. 16. The highlighted signature segment is the signature of the person 'Alison Bob'.

Figure 17:
FIG. 17 is the third page of the example electronic document of FIG. 14 with entity data and a data segment highlighted.

An example of a third page of the modified electronic document with one highlighted signature segment and seven highlighted entity data is illustrated in FIG. 17. The highlighted signature segment is the signature of the person 'Charles Sharma'. The first highlighted entity data is the date '10/03/2022', the second highlighted entity data is the street address '129 Upland Avenue', the third highlighted entity data is the city address 'Polk', the fourth highlighted entity data is the state address 'Kentucky', the fifth highlighted entity data is the zip code address '49503', the sixth highlighted entity data is the e-mail address 'charles@kopiker.com', and the seventh highlighted entity data is the telephone number '098045118'.

The system 1 receives feedback data 91 from the user 21. The system 1 may update 92 the text knowledge base section of the knowledge base 4, and/or the signature knowledge base section of the knowledge base 4, and/or the stamp knowledge base section of the knowledge base 4 based on the user feedback data. The system 1 may update 93 the third natural language processing closed-domain question answering model, and/or the image recognition model, and/or the natural language processing model based on the user feedback data.

In relation to the example modified electronic document illustrated in FIGS. 15 to 17, the text knowledge base section of the knowledge base 4 may be updated with the following:
entity of 'Assignor' with the n-gram words and scores:
assignor 0.8
agree 0.7
terms 0.5
entity of 'Assignee' with the n-gram words and scores:
allow 0.7
purpose 0.7
entity of 'Event Name' with the n-gram words and scores:
participation 0.8
content 0.8
entity of 'Assignor's Email' with the n-gram words and scores:
email 0.9
entity of 'Assignor's Telephone' with the n-gram words and scores:
telephone 0.9
entity of 'Assignor's Address' with the n-gram words and scores:
Address 0.9
entity of 'Assignor's City' with the n-gram words and scores:
Address 0.8
entity of 'Assignor's State' with the n-gram words and scores:
Address 0.7
entity of 'Assignor's Zip' with the n-gram words and scores:
Address 0.6

The signature knowledge base section of the knowledge base 4 may be updated with the following:
entity of 'Assignor's signature' with the n-gram words and scores:
accepted 0.7
agreed 0.8
entity of 'Assignee's signature' with the n-gram words and scores:
Yours 0.7
Sincerely 0.8

The data processing system 1 includes the artificial intelligence technologies described above, such as the optical character recognition processor, the natural language processing models, and the image recognition models. The optical character recognition processor has improved object position recognition.

The data processing system 1 is suitable for operation with a plurality of electronic documents in the real-time data set 11, for example up to 20 documents or more, with each electronic document ranging from a hundred to a thousand pages. The data processing system 1 is suitable for operation with a range of types of electronic documents, for example financial services documents such as a mix of commercial loan and mortgage documents, and legal documents such as powers of attorney, declarations, and the like. The data processing system 1 is capable of reviewing complex documents which include blocks of text mixed with tables, signature blocks, stamp blocks, variations of text blocks in different form, and the like. With the data processing system 1, the models are trained to read tables, segments of tables, and the like using the document classifiers described in detail above.

The data processing system 1 may operate with a communications network, such as a cloud-based storage and communication of data.

The embodiments described previously with reference to the accompanying drawings comprise a computer system and/or processes performed by the computer system. However the described embodiments also extend to computer programs, particularly computer programs stored on or in a carrier adapted to bring the described embodiments into practice. The program may be in the form of source code, object code, or a code intermediate source and object code, such as in partially compiled form or in any other form suitable for use in the implementation of the method according to the described embodiments. The carrier may comprise a storage medium such as ROM, such as a CD-ROM, or magnetic recording medium, such as a floppy disk or hard disk. The carrier may be an electrical or optical signal which may be transmitted via an electrical or an optical cable or by radio or other means.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the described embodiments are to be understood to be applicable to any other aspect, embodiment or example described herein unless incompatible therewith.

All of the features disclosed in this specification (including any accompanying claims, abstract and drawings), and/or all of the steps of any method or process so disclosed, may be combined in any combination, except combinations where at least some of the features and/or steps are mutually exclusive. The described embodiments are not restricted to any details of any foregoing embodiments. The described embodiments extend to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A computer-implemented method for identifying entity data in a data set, the method comprising the steps of:
    receiving a data set,
    extracting text data from the data set using a text extractor,
    determining a plurality of candidate entity data and candidate context data based on the extracted text data using a trained natural language processing model,
    accessing one or more n-gram words stored in a knowledge base,
    determining one or more similarity scores based on the candidate context data and the one or more n-gram words, and
    selecting an optimum entity data from the plurality of candidate entity data based on the one or more similarity scores,
    wherein the method comprises the step of training the natural language processing model by:
    receiving a training data set,
    extracting training text data from the training data set using the text extractor,
    determining a plurality of training entity data based on the extracted training text data using an initialisation data set,
    receiving one or more question data from a user,
    determining one or more answer data based on the plurality of training entity data and the one or more question data using a second natural language processing model,
    determining training context data based on the plurality of training entity data and the one or more question data, and
    training the natural language processing model based on the one or more answer data and the training context data.

2. A method as claimed in claim 1 wherein the text extractor comprises an optical character recognition processor.

3. A method as claimed in claim 1 wherein the trained natural language processing model comprises a closed-domain question answering model.

4. A method as claimed in claim 1 wherein the one or more similarity scores are determined by determining a similarity score between each candidate context data and each of the one or more n-gram words.

5. A method as claimed in claim 1 wherein the method comprises the step of determining a weighted average of the one or more similarity scores, and the optimum entity data is selected based on the weighted average.

6. A method as claimed in claim 1 wherein the method comprises the steps of:
   modifying the data set based on the optimum entity data, and
   providing the modified data set to a user.

7. A method as claimed in claim 6 wherein the data set is modified by visual highlighting of the optimum entity data.

8. A method as claimed in claim 1 wherein the method comprises the steps of:
   receiving feedback data from a user, and
   modifying at least one of the knowledge base, and the natural language processing model based on the feedback data.

9. A method as claimed in claim 1 wherein the method comprises the steps of:
   determining a plurality of n-gram words based on the one or more answer data and the training context data using a further natural language processing model, and
   storing at least some of the n-gram words in the knowledge base.

10. A method as claimed in claim 1 wherein the method comprises the steps of:
    receiving classification selection data from the user, and
    identifying a sub-set of the training data set based on the classification selection data.

11. A method as claimed in claim 10 wherein the method comprises the step of determining a classification for each of the sub-set of the training data set based on the extracted training text data using a representation model.

12. A method as claimed in claim 1 wherein the initialisation data set is pre-defined.

13. A method as claimed in claim 1 wherein the second natural language processing model comprises an open-domain question answering model.

14. A method as claimed in claim 1 wherein the method comprises the steps of:
    providing the one or more answer data to the user, and
    receiving corrected entity data from the user,
    wherein the natural language processing model is trained based on the corrected entity data and the training context data.

15. A method as claimed in claim 9 wherein the plurality of n-gram words are determined based on the corrected entity data and the training context data using the further natural language processing model.

16. A method as claimed in claim 1 wherein the data set comprises one or more electronic documents.

17. A method as claimed in claim 16 wherein the one or more electronic documents are received in image format.

18. A data processing system for identifying entity data in a data set, the system comprising a processor configured to:
    receive a data set,
    extract text data from the data set using a text extractor,
    determine a plurality of candidate entity data and candidate context data based on the extracted text data using a trained natural language processing model,
    access one or more n-gram words stored in a knowledge base,
    determine one or more similarity scores based on the candidate context data and the one or more n-gram words, and
    select an optimum entity data from the plurality of candidate entity data based on the one or more similarity scores,
    wherein the processor is configured to train the natural language processing model, wherein the processor is configured to:
    receive a training data set,
    extract training text data from the training data set using the text extractor,
    determine a plurality of training entity data based on the extracted training text data using an initialisation data set,
    receive one or more question data from a user,
    determine one or more answer data based on the plurality of training entity data and the one or more question data using a second natural language processing model,
    determine training context data based on the plurality of training entity data and the one or more question data, and
    train the natural language processing model based on the one or more answer data and the training context data.

19. A computer program product stored on a non-transitory computer readable storage medium, the computer program product comprising instructions capable of causing a computer system to perform a method as claimed in claim 1 when the computer program product is executed on the computer system.

* * * * *